(12) United States Patent
Kataoka et al.

(10) Patent No.: US 6,619,817 B1
(45) Date of Patent: Sep. 16, 2003

(54) ILLUMINATION DEVICE (75) Inventors: Hisao Kataoka, Niigata (JP);
Masatoshi Ueno, Niigata (JP)

(73) Assignee: Matsushita Electric Works, Ltd., Osaka (JP)

(*) Notice: Subject to any disclaimer, the term of this patent is extended or adjusted under 35 U.S.C. 154(b) by 0 days.

(21) Appl. No.: 09/830,161

(22) PCT Filed: Oct. 2, 2000

(86) PCT No.: PCT/JP00/06842

§ 371 (c)(1),
(2), (4) Date: Apr. 23, 2001

(87) PCT Pub. No.: WO01/23802

PCT Pub. Date: Apr. 5, 2001

(30) Foreign Application Priority Data

Sep. 30, 1999  (JP) ............................................. 11-280152

(51) Int. Cl.[7] ................................................. F21K 2/00
(52) U.S. Cl. ...................... 362/265; 362/263; 362/267; 362/310
(58) Field of Search ................................. 362/263, 265, 362/267, 310, 519, 548

(56) References Cited

U.S. PATENT DOCUMENTS

| 5,072,348 | A | * | 12/1991 | Tsukada ..................... 362/226 |
| 5,604,406 | A | * | 2/1997 | Gaus ........................ 315/200 A |
| 5,795,056 | A | * | 8/1998 | Seiger ......................... 362/226 |
| 5,957,569 | A | * | 9/1999 | Helbig et al. ................ 362/226 |
| 6,066,921 | A | | 5/2000 | Nakamura et al. |
| 6,161,951 | A | | 12/2000 | Yoneyama et al. |
| 6,388,380 | B1 | * | 5/2002 | Minami et al. ................ 315/57 |

FOREIGN PATENT DOCUMENTS

| JP | 7-114805 | 5/1995 |
| JP | 10-147174 | 6/1998 |
| JP | 10-188604 | 7/1998 |
| JP | 10-228804 | 8/1998 |
| JP | 10-261301 | 9/1998 |

* cited by examiner

Primary Examiner—Sandra O'Shea
Assistant Examiner—Guiyoung Lee
(74) Attorney, Agent, or Firm—Burns, Doane, Swecker & Mathis, LLP (57) ABSTRACT

A luminaire is provided with a reflector, a lamp body, a discharge lamp, an igniter, a lighting circuit including an inverter, and a socket, wherein both of the igniter and lighting circuit are disposed in the socket, the discharge lamp is fixed to the socket, the socket is fixed to the reflector, and the discharge lamp is housed in the reflector, whereby it is enabled to attempt a reduction of constituting parts of the lighting circuit in the luminaire and, in particular, to attempt an improvement in assembling workability of the luminaire.

10 Claims, 10 Drawing Sheets

ILLUMINATION DEVICE

TECHNICAL FIELD

This invention relates to luminaires and, in particular, to such luminaires as automotive head lamps.

BACKGROUND ART

The luminaires of this kind have been disclosed in, for example, Japanese Patent Laid-Open Publications Nos. 7-114805 and 10-147174. The luminaire disclosed in Publication No. 7-114805 comprises a lamp body, a discharge lamp, an igniter, an inverter and a junction member electrically connecting between the lamp and the igniter, wherein the discharge lamp, igniter and junction member are provided integral, while the inverter is separately disposed. In this luminaire, however, there has been required a harness for coupling between the igniter and the inverter, so as to be troublesome in that required parts number is increased, assembling workability is deteriorated thereby, and manufacturing costs increase.

In the other Publication No. 10-147174, the luminaire comprises a lighting device including a lamp body, a discharge lamp, an igniter, a lighting circuit including an inverter, and a socket for connecting between the discharge lamp and the igniter, and the lighting device and socket are coupled by means of the harness. As the harness is also required for coupling the igniter and socket in this luminaire, there have been not only the same trouble of the deteriorated workability of assembling and the increased manufacturing costs but also a problem of safetyness due to that high voltage wires are exposed to exterior.

DISCLOSURE OF INVENTION

An object of the present invention is to provide a luminaire which has eliminated the foregoing problems and has been improved in the reduction of required constituent number and in the assembling workability with respect to the lamp body.

According to the present invention, the above object can be realized by means of a luminaire which comprises a lamp body, a discharge lamp, an igniter, a lighting device including an inverter, and a jointer, wherein the igniter and inverter are both disposed inside the jointer.

Other objects and advantages of the present invention should become clear as the description of preferred embodiments advances in the followings with reference to accompanying drawings showing the embodiments.

While the present invention shall be described with reference to the respective embodiments shown in the accompanying drawings, it should be appreciated that the intention is not to limit the invention only to these embodiments but rather to include all alterations, modifications and equivalent arrangements possible within the scope of appended claims.

The Best Mode for Carrying Out the Invention

Figure 1:
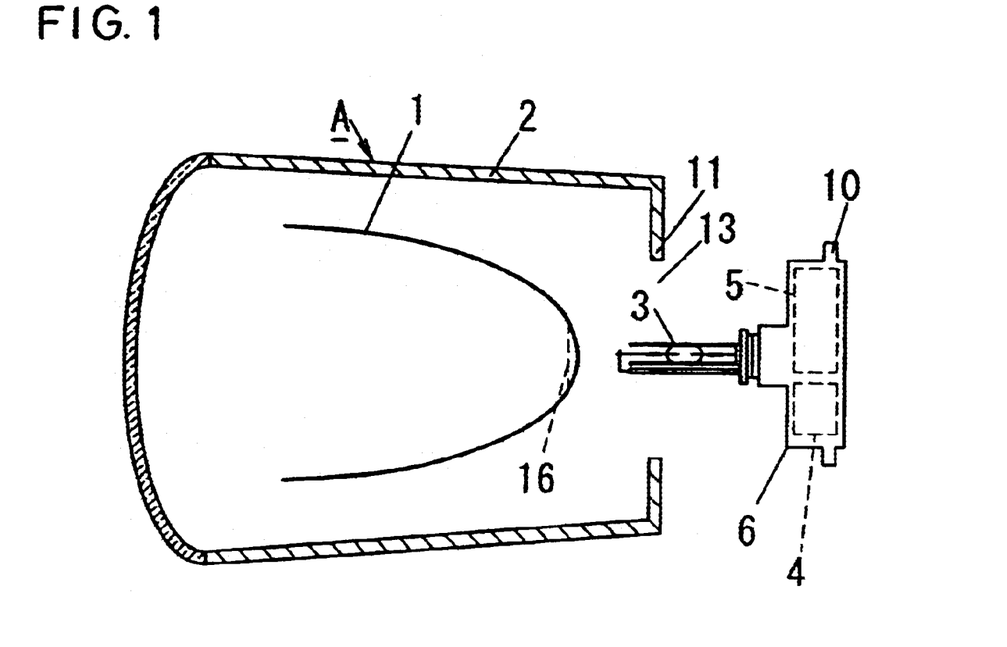
FIG. 1 is an explanatory view for an arrangement in an embodiment of the luminaire according to the present invention.

In FIG. 1, there is shown an embodiment of the luminaire A according to the present invention, in which the luminaire A comprises a reflector 1 as a light reflecting plate in the present embodiment, a lamp body 2 constituting an outer shell of this luminaire, a discharge lamp 3, an igniter 4 as a starter, a lighting circuit 5 including an inverter, and a socket 6. This luminaire A of the present invention is loaded, for example, on automobiles as their head lamps. Here, the lighting circuit 5 including the inverter is capable of supplying a power to the discharge lamp 3 with a source power converted. In this case, the igniter 4 can generate a high voltage to start the discharge lamp 3. In the present embodiment, both of the igniter 4 and lighting circuit 5 are disposed in the socket 6. To this socket 6, the discharge lamp 3 is secured. Then, in the present embodiment, the socket 6 incorporating both of the igniter 4 and lighting circuit 5 and carrying the discharge lamp 3 secured is detachably secured to the reflector 1 disposed inside the lamp body 2. In this case, the discharge lamp 3 secured to the socket 6 is inserted within the reflector 1 through a rear opening 16 (shown here by a dotted line) of the reflector 1 and is housed within the reflector 1. At this time, the socket 6 is seated in an aperture 13 provided in rear wall 11 of the lamp body 2, while a coupler 10 is provided preferably as projected out of peripheral part of the socket 6 to engage with peripheral edge of the aperture 13, so as to be able to air-tightly couple the socket 6 to the aperture 13.

Figure 2:
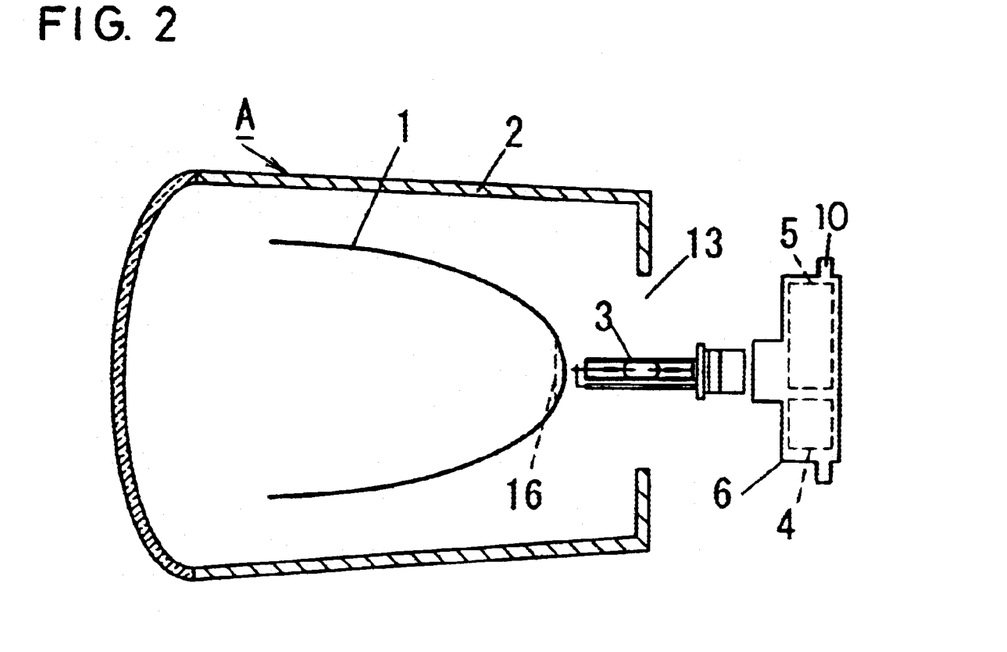
FIG. 2 is an explanatory view for an arrangement in another embodiment of the luminaire according to the present invention.

It is possible to arrange the discharge lamp 3 and socket 6 so as to be first mounted to the rear opening 16 of the reflector 1 in mutually separated state as in FIG. 2, and then to couple the discharge lamp 3 while assembling the socket 16 into the aperture 13 in the rear wall 11 of the lamp body 2.

In the foregoing embodiment, there is required no separate cover for covering the lighting circuit 5 containing the inverter, and the respective parts can be incorporated within the lamp body 2. Both of the igniter 4 and lighting circuit 5 are incorporated in the socket 6 so that no harness or the like is required, the required number of parts can be reduced and the assembly or exchange of the lighting circuit and so on with respect to the lamp body 2 can be made easier.

Figure 3:
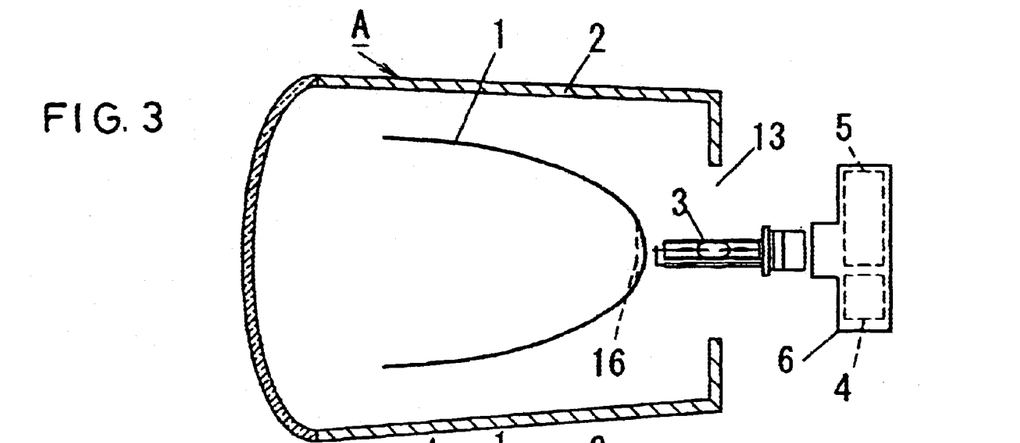
FIG. 3 is an explanatory view for an arrangement in another embodiment of the luminaire according to the present invention.
Figure 4:
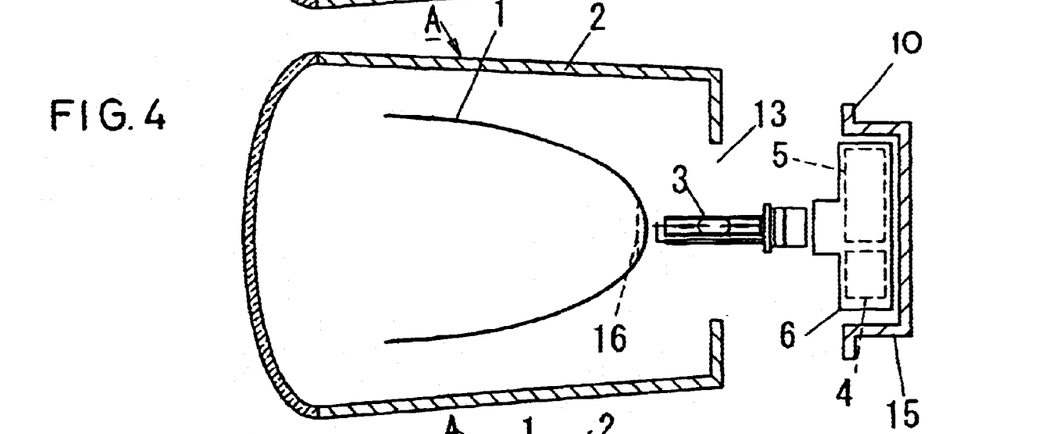
FIGS. 4 and 5 are explanatory views for an assembling work of the luminaire in the embodiment of FIG. 3.
Figure 5:
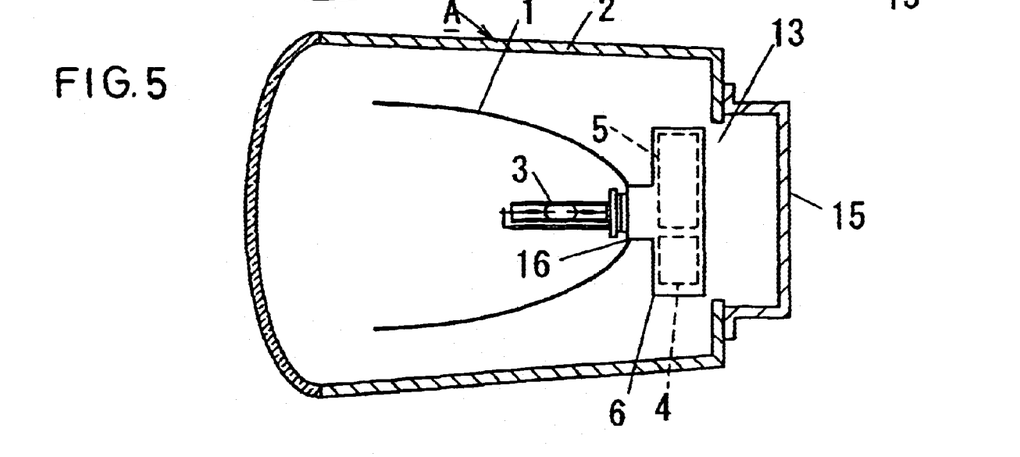

In another embodiment of the present invention as shown in FIGS. 3–5, a lamp-body cover 15 is provided to enclose the socket 6. The coupler 10 is provided to the periphery of this lamp-body cover 15 so that, when the discharge lamp 3 is mounted to the reflector 1 and the socket 6 is mounted to the discharge lamp 3, the coupler 10 of the lamp-body cover 15 can hermetically engage with the peripheral edge of the aperture 13 provided in the rear wall 11 of the lamp body 2. Other arrangements in the present embodiment are the same as the foregoing embodiment and are shown with the same reference numbers in FIGS. 3–5.

Figure 6:
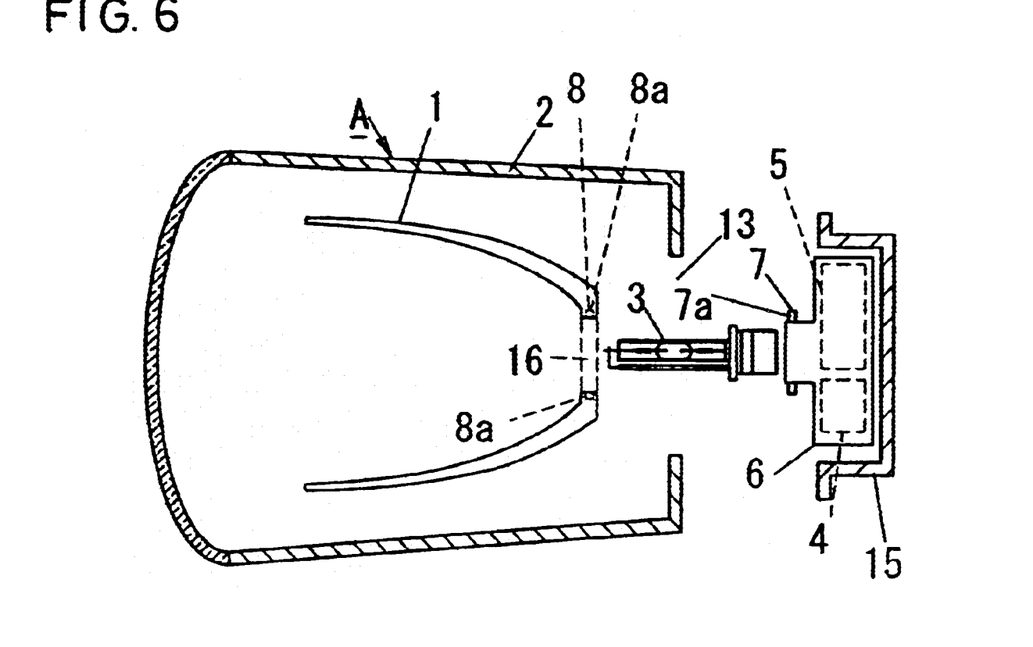
FIG. 6 is an explanatory view for an arrangement in another embodiment of the luminaire according to the present invention.
Figure 7:
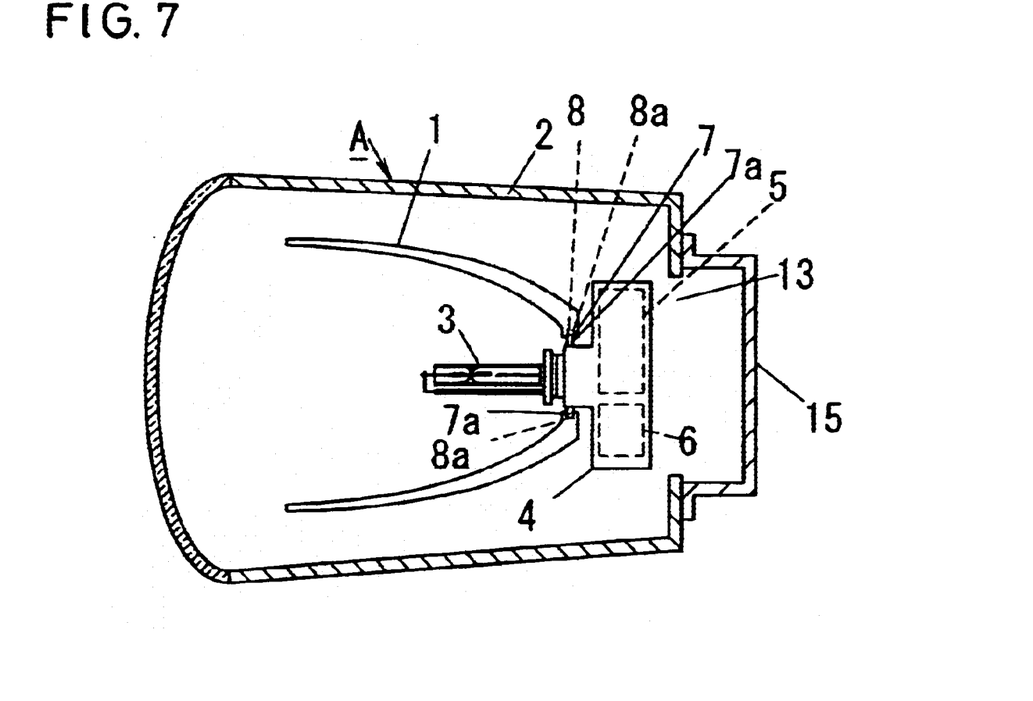
FIG. 7 is an explanatory view for an assembled state of the luminaire of FIG. 6.

In another embodiment of the present invention as shown in FIGS. 6 and 7, the socket 6 is provided with a mounting part 7, while the reflector 1 is provided with a receiving part 8. Thus, engaging projections 7a are provided at a plurality of positions on front periphery to project outward to form the mounting part 7, and a plurality of engaging grooves 8a forming the receiving part 8 are formed circumferentially along inner periphery of the rear opening 16 provided at rear end of the reflector 1 incorporated in the lamp body 2. While the respective engaging grooves 8a are opened towards the side of the rear opening 16, the engaging grooves 8a are partly opened also towards the side of rear face of the reflector 1 to form inserting openings (not shown). Further, the arrangement is so made that the engaging projections 7a provided to the socket 6 are inserted through the inserting openings provided to the reflector 1 into the engaging grooves 8a and, in this state, the socket 6 is rotated to engage the engaging projections 7a in the engaging grooves 8a to be mounted therein. In dismounting, the socket 6 is rotated in reverse direction, and the engaging projections 7a are drawn out of the inserting openings of the reflector 1, so as to dismount them in a simpler manner.

Now, in the embodiment shown in FIGS. 6 and 7, in particular, the assembly or exchange of parts is easily made only by the simple rotational engagement of the socket 6 provided for mounting it to the reflector 1 in the rotational engagement.

Figure 8:
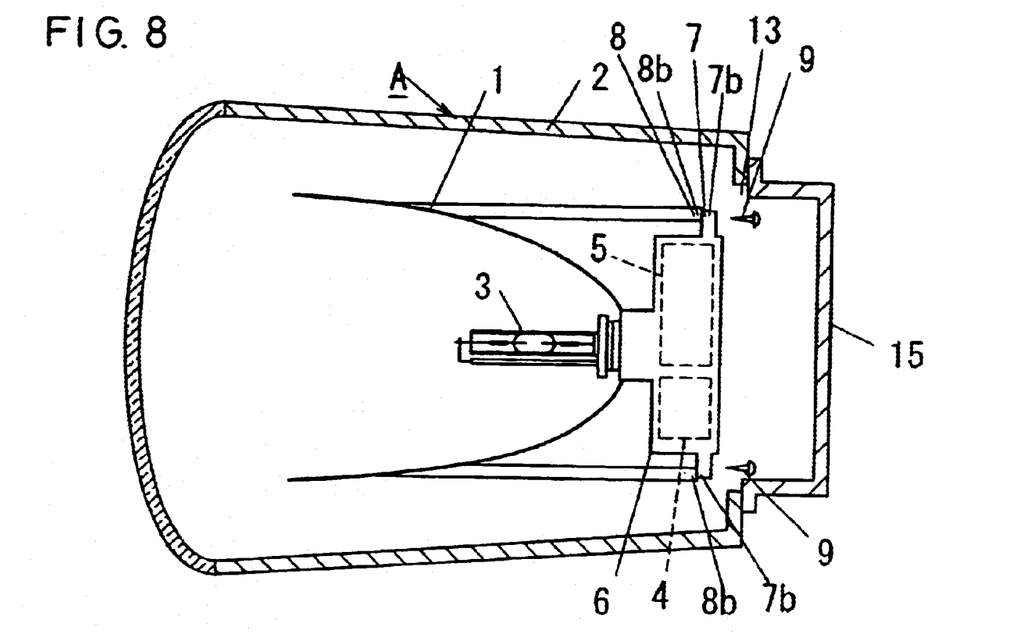
FIGS. 8 through 12 are respectively an explanatory view for arrangements in other embodiments of the luminaire according to the present invention.

In another embodiment shown in FIG. 8, the socket 6 is provided with the mounting part 7, and the reflector 1 is provided with the receiving part 8. In this case, the mounting part is formed by means of outward projection or projections 7b provided to the whole periphery or at a plurality of positions on the outer periphery at front part of the socket 6, while a plurality of projections 8b forming the receiving part 8 are provided to a rear end of the reflector 1 incorporated in the lamp body 2 at a plurality of positions or over the entire circumference of the rear opening 16. Then the projection 7b provided to the socket 6 is engaged to rear end face of the projections 8b provided to the reflector 1, and is mounted detachably by means of screws 9. Its dismounting can be attained simply by unfastening the screws 9. Other arrangements of this embodiment are the same as the foregoing embodiments, and are shown in FIG. 8 with the same reference numbers.

Figure 9:
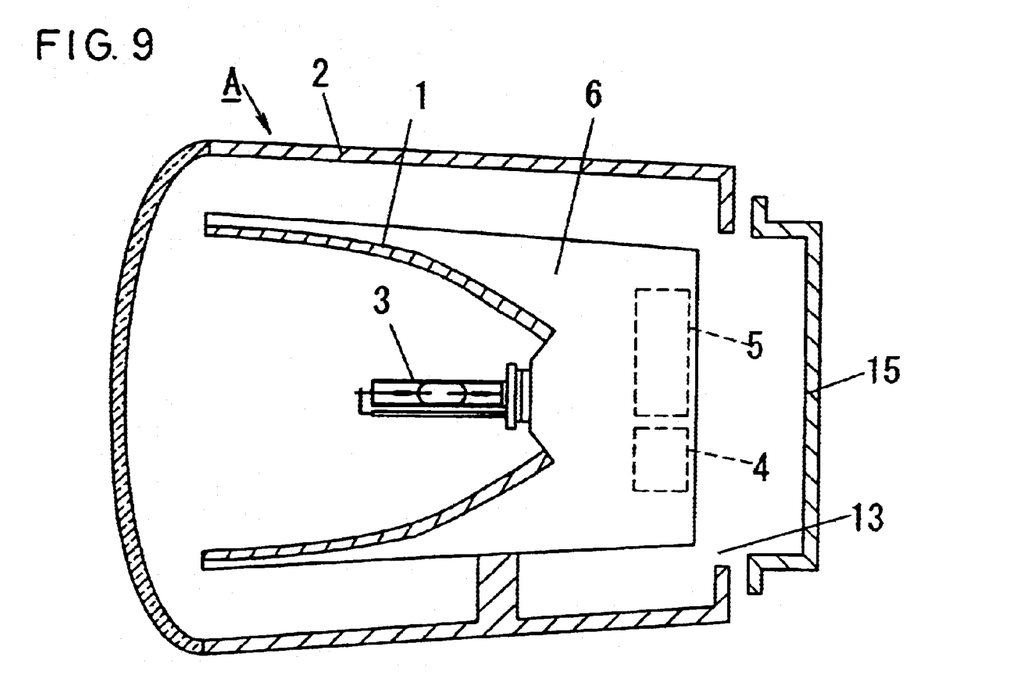

In another embodiment shown in FIG. 9 of the present invention, the socket 6 and reflector 1 are integrally molded in the luminaire A which comprises the reflector 1, lamp body 2, discharge lamp 3, igniter 4, lighting circuit 5 with the inverter included, and socket 6, wherein the igniter 4 and lighting circuit 5 are both incorporated in the socket 6 molded integral with the reflector 1, and the discharge lamp 3 is fixed to the socket 6 so that the lamp 3 will be housed within the reflector 1.

In the present embodiment, the integral molding of the socket 6 and reflector 1 renders the reflector not required to be made as a separate one of parts, such parts as the harness can be omitted, the costs can be reduced, the required number of parts can be reduced to allow the harness or the like parts to be omitted, and the assembly or exchange with respect to the lamp body 2 can be performed in a simple manner. Also in the present embodiment, the lamp-body cover 15 is provided to hermetically close the aperture 13 of the lamp body 2, so that the socket 6 can be made to be of non-waterproof structure, and the dimensional minimization of the lighting circuit 5 containing the inverter or the like parts can be attempted. Further, in confirming the appearances of the discharge lamp 3 upon a lighting abnormality or the like, the discharge lamp 3 which is very hot as being immediately after being lighted can be detached without touching by dismounting from the lamp body 2 the socket 6 to which the discharge lamp 3 is fixed, so that the appearances of the discharge lamp 3 can be observed even immediately after being lighted.

Figure 10:
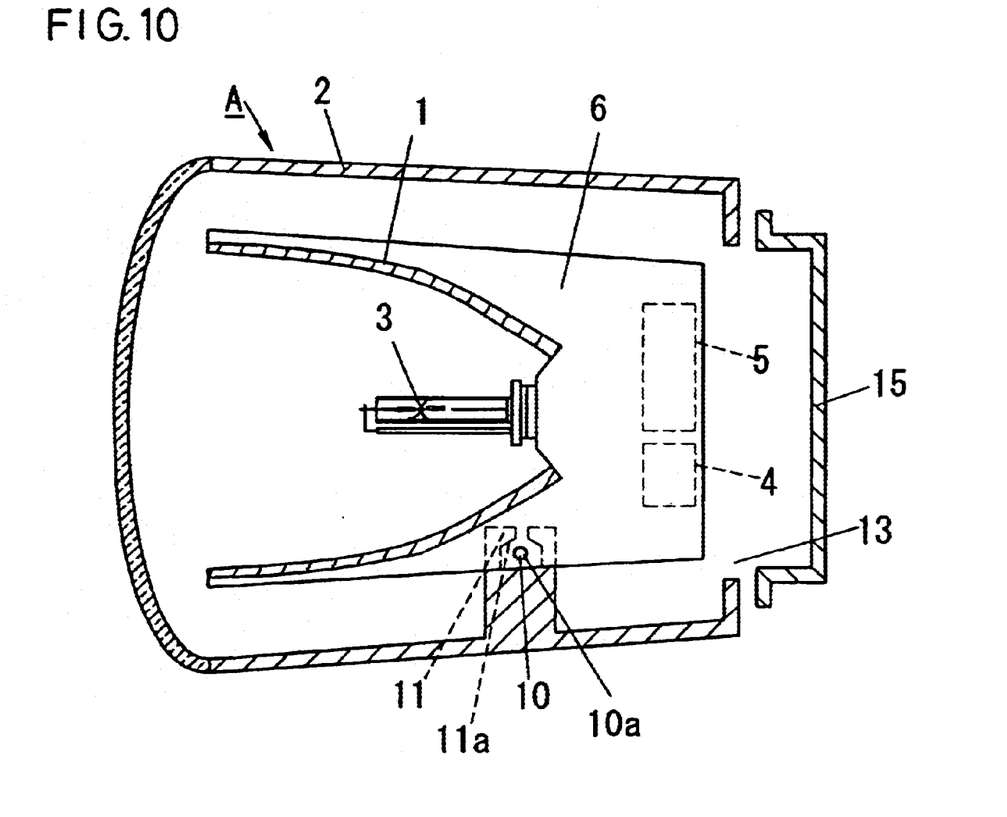

In another embodiment of the present invention as shown in FIG. 10, the socket 6 is provided with the coupler 10, while the lamp body 2 is provided with a receiver 11, and they are arranged for mounting with the coupler 10 engaged in the receiver 11. That is, the socket 6 and reflector 1 are integrally molded, and the socket 6 molded integrally with the reflector 1 is detachably mounted with the coupler 10 of the socket 6 engaged in the receiver 11 of the lamp body 2. In this case, it may be also possible to provide the socket 6 and reflector 1 in separate members, so that the socket 6 is fixed to the separate reflector 1 and is detachably mounted with the coupler 10 of the socket 6 engaged in the receiver 11 of the lamp body 2. In mounting the socket 6 to the lamp body 2 as coupled, thus the mounting can be simply attained by the engagement of the coupler 10 to the receiver 11.

More specifically, the socket 6 is provided with shafts 10a as the coupler 10, C-shaped shaft bearings 11a are provided to the interior of the lamp body 2, the shaft parts 10a are engaged through openings of the C shape into the C-shaped shaft bearings 11a, the shaft parts 10a are made movable within the shaft bearings 11a and hence the socket 6 is made movable, for adjusting the light distribution.

Figure 11:
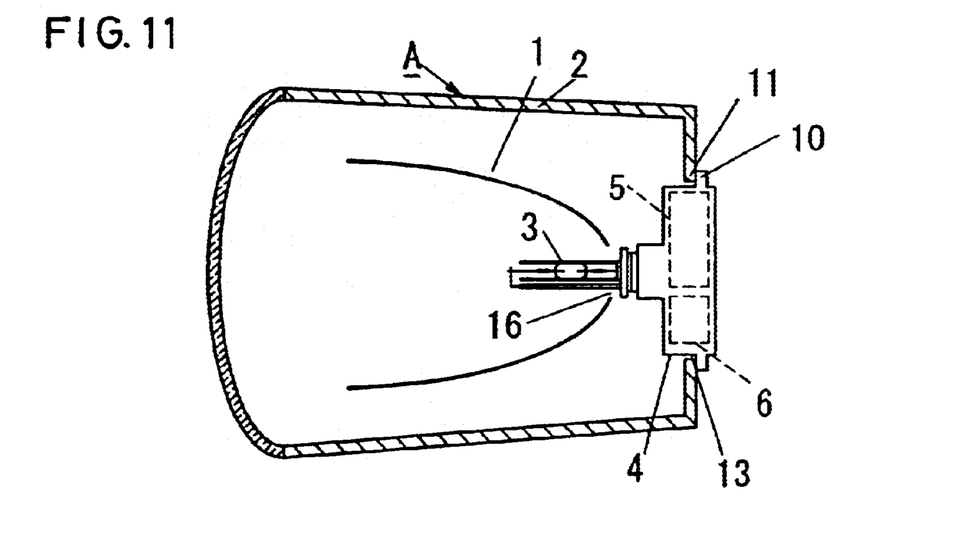

Next, in another embodiment of the present invention as shown in FIG. 11, the luminaire A comprises the reflector 1, lamp body 2, discharge lamp 3, igniter 4, lighting circuit 5 including the inverter, and socket 6, and, in the present embodiment, both of the igniter 4 and lighting circuit 5 are incorporated in the socket 6. Further, the discharge lamp 3 is fixed to the socket 6. While the socket 6 is to be fixed to the lamp body 2 in the state where both of the igniter 4 and lighting circuit 5 are incorporated and the discharge lamp 3 is fixed, the discharge lamp 3 is to be housed as inserted through the rear aperture 13 of the lamp body 2 and through the rear opening 16 of the reflector 1.

Now, according to the embodiment shown in FIG. 11, no separate cover is required for covering the lighting circuit 5 including the inverter, and it is possible to have the respective parts mounted in the lamp body 2. Further, as both of the igniter 4 and lighting circuit 5 are incorporated in the socket 6 and this socket 6 is mounted to the lamp body 2, the required parts number is reduced, parts number of harness and the like is also reduced, and the assembly or exchange of the lighting circuit 5 and so on with respect to the interior of the lamp body 2 is made easier. In observing the appearances of the discharge lamp 3 upon lighting abnormality or the like, the discharge lamp 3 very hot immediately after being lighted can be dismounted without touching, by detaching the socket 6 with the discharge lamp 3 fixed thereto from the lamp body 2, and the appearances of the discharge lamp 3 even immediately after being lighted can be observed.

Figure 12:
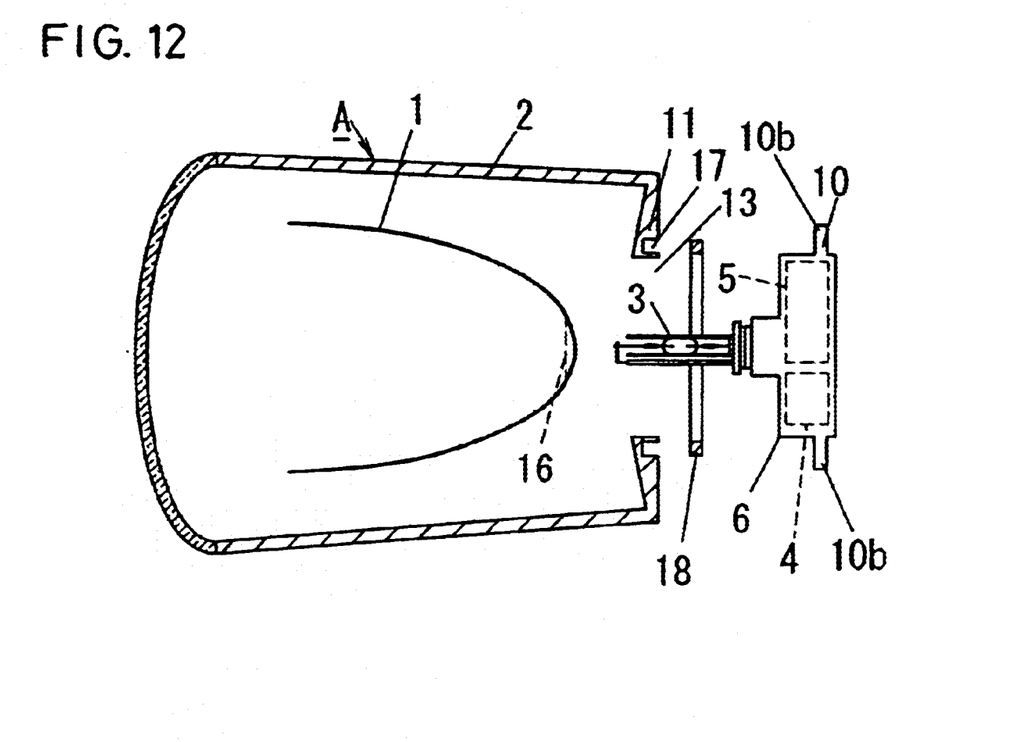
Figure 13:
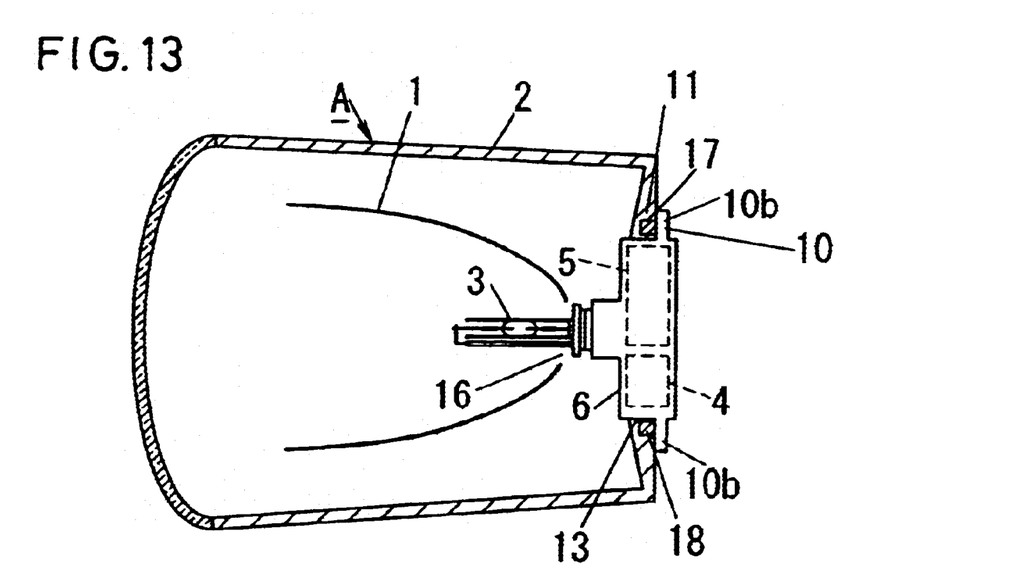
FIG. 13 is an explanatory view for an assembled state of the luminaire in FIG. 12.

In another embodiment according to the present invention as shown in FIGS. 12 and 13, the socket 6 is provided with the coupler 10, and the lamp body 2 is provided with the receiver 11. Outward projection 10b is provided at a plurality of positions or over the whole of the outer periphery of the socket 6 to form the coupler 10. On the other hand, an annular groove 17 is provided at peripheral part of the rear aperture 13 in the rear wall of the lamp body 2, and a peripheral part of the groove 17 in the rear wall of the lamp body 2 forms the receiver 11. An annular elastic member 18 is fitted in the annular groove 17, the socket 6 is fitted in the aperture 13 with the discharge lamp 3 on the socket 6 inserted into the reflector 1 through the rear opening 16 of the reflector 1 disposed in the lamp body 2, and the projection 10b is mounted to the lamp body 2 with an optional mounting means, in a state where the elastic member 18 is pressed with the projection 10b for hermetic closing. In this case, a portion of the socket 6 exposed to the exterior out of the lamp body 2 is made to be of a waterproof structure.

With such shielding of the aperture 13 by the socket 6, it is enabled to render the socket 6 to act also as the lamp-body cover for shielding the aperture, to allow any separate lamp-body cover not required, whereas the most part of the socket 6 is assembled in the lamp body 2, so that any consideration of waterproofness with respect to the socket 6 may be limited only to the portion exposed to the exterior of the lamp body 2, other portion (such as the lighting circuit 5 etc.) than that exposed out of the lamp body 2 may be allowed to be non-waterproof, and the dimensional minimization and weight reduction can be attained. Further, any separate cover for the lighting circuit 5 comprising the inverter as has been well known is not required, and the respective parts can be incorporated in the lamp body 2. Further, as both of the igniter 4 and lighting circuit 5 are incorporated in the socket 6, the parts number is reduced in this respect, too, in addition to the parts number reduction in respect of the harness and the like, and the assembly or exchange of the lighting circuit 5 and so on with respect to the lamp body 2 is made easier. In observing the appearances of the discharge lamp 3 upon occurrence of the lighting abnormality and the like, the discharge lamp 3 remarkably hot immediately after being lighted is made dismountable without holding the lamp, and the discharge lamp 3 can be observed in respect of its appearances even immediately after being lighted.

Other arrangements of the present embodiment are the same as the foregoing embodiments and are shown in FIGS. 12 and 13 with the same reference numbers.

Figure 14:
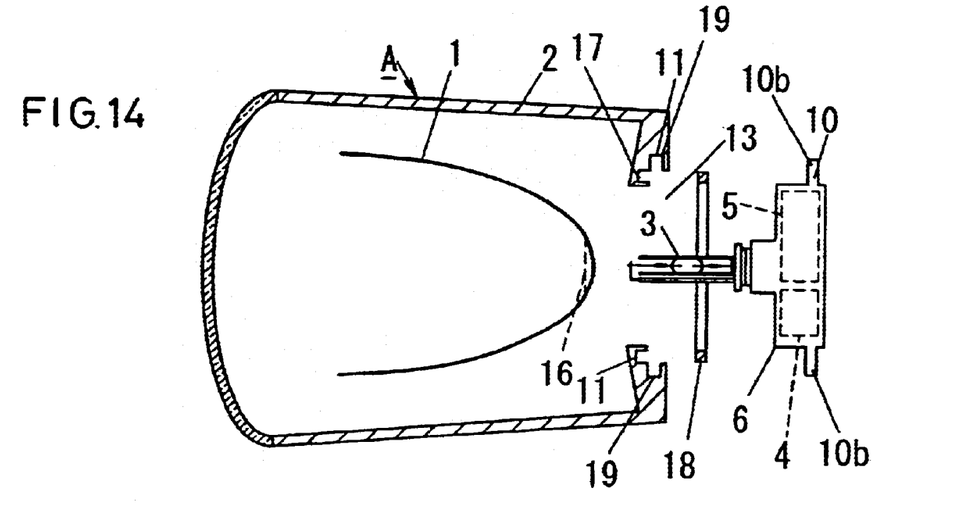
FIG. 14 is an explanatory view for an arrangement in another embodiment of the present invention.
Figures 15, 16:
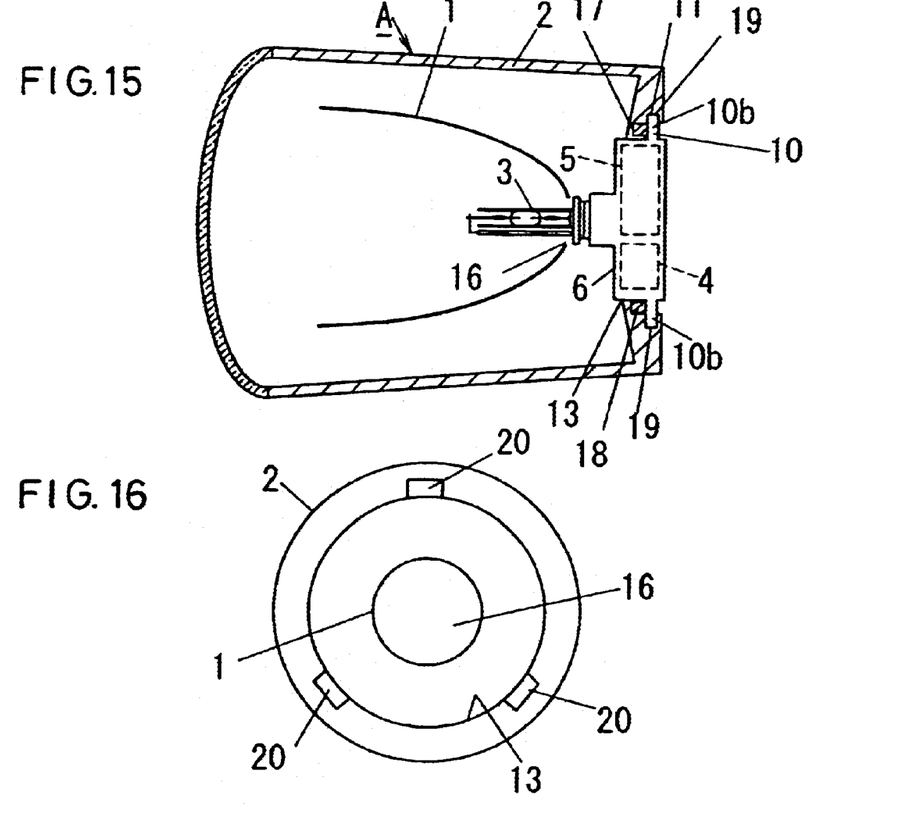
FIG. 15 is an explanatory view for an assembled state of the luminaire of FIG. 14.
FIG. 16 is a rear side view of a lamp body in the embodiment of FIG. 14.

In another embodiment according to the present invention as shown in FIGS. 14, 15 and 16, the outward projections 10b are provided at a plurality of positions on the periphery of the socket 6, to form the coupler 10. On the other hand, the annular groove 17 is provided in the rear face part around the rear aperture 13 of the lamp body 2, further engaging grooves 19 communicating with the groove 17 are formed in the periphery of the groove 17, and these engaging grooves 19 are partly opened rearward as in FIG. 16 to form inserting openings 20. The annular elastic member 18 is engaged in the annular groove 17, the socket 6 is engaged in aperture 13 to insert at the same time the discharge lamp 3 mounted to the socket 6 into the reflector 1 through the rear opening 16 of the reflector 1 incorporated in the lamp body 2, the projections 10b are inserted in this state into the engaging grooves 19 through the inserting openings 20, and the projections 10b are engaged in the engaging grooves 19 with the socket 6 rotated, to thereby mount the socket 6 to the lamp body 2. In this case, the elastic member 18 is depressed by the projections 10b, so that the mounting of the socket 6 to the lamp body 2 can be made hermetical. Here, the portion of the socket 6 exposed out of the lamp body 2 is made to be of the waterproof structure. Dismounting can be realized in simple manner by rotating the socket 6 in reverse direction and drawing the projections 10b out of the inserting openings 20.

Other arrangements in the present embodiments are the same as the foregoing embodiments and are shown with the same reference numbers in FIGS. 14–16.

Figure 17:
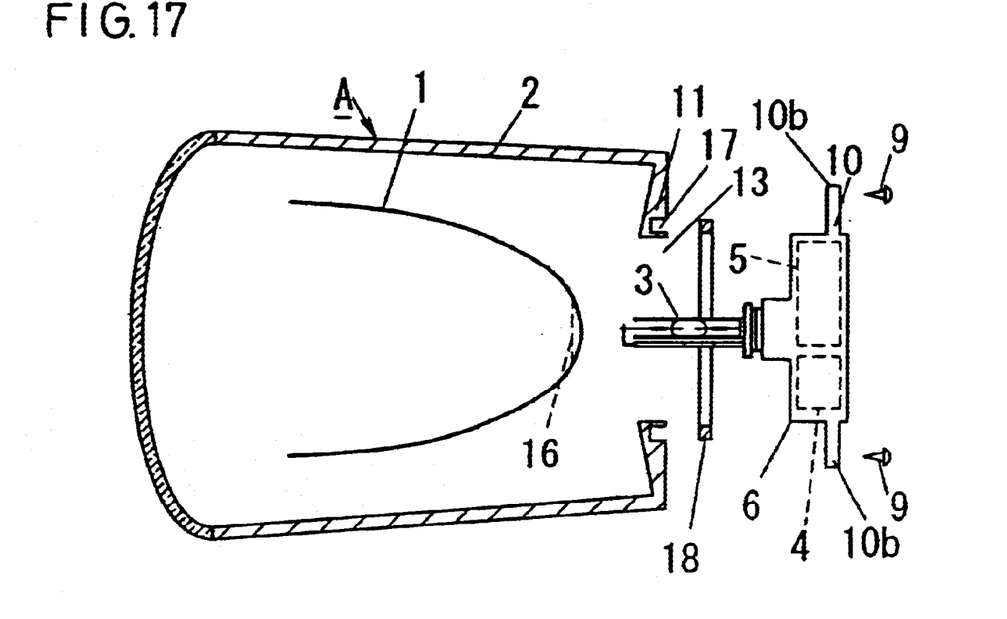
FIG. 17 is an explanatory view for an arrangement in another embodiment of the present invention.
Figure 18:
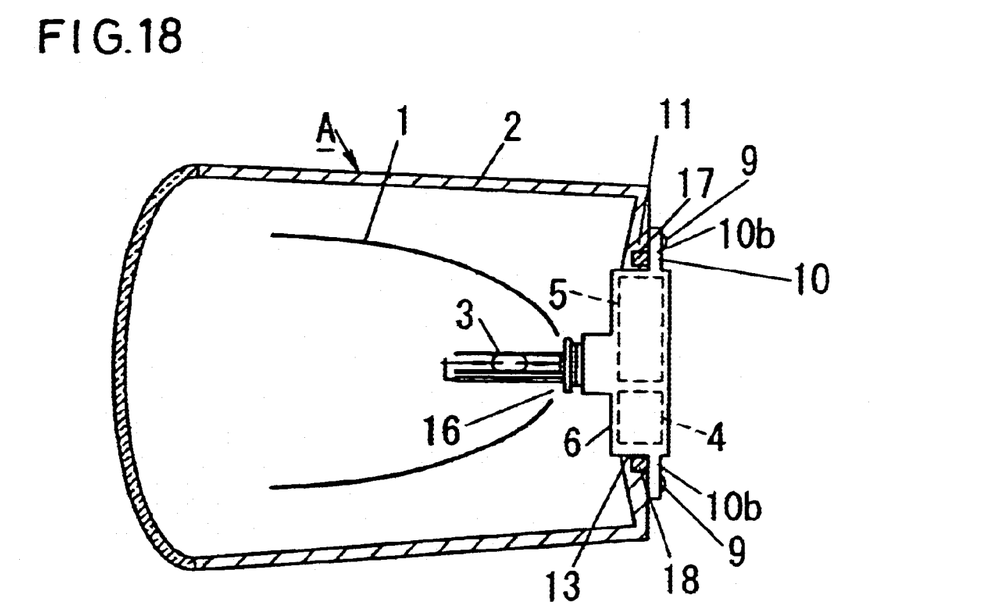
FIG. 18 is an explanatory view for an assembled state of the luminaire of FIG. 17.

In another embodiment according to the present invention as shown in FIGS. 17 and 18, the coupler 10 is formed with the outward projection 10b provided along the whole or at a plurality of positions of the periphery of the socket 6. On the other hand, the annular groove 17 is provided at peripheral edge of the aperture 13 made at the rear part of the lamp body 2, and a peripheral part of this annular groove 17 is provided as the receiving part 11. Now, the annular elastic member 18 is fitted in the annular groove 17, the socket 6 is fitted in the aperture 13 to insert simultaneously the discharge lamp 13 mounted to the socket 6 into the reflector 1 through the rear opening 16 of the reflector 1 incorporated in the lamp body 2, the elastic member 18 is pressed in this state by means of the projection 10b, and this projection 10b forming the coupler 10 is mounted by means of the screws 9 to the receiving part 11 on the rear face of the lamp body 2. In this case, the mounting of the socket 6 to the lamp body 2 is made hermetical by the pressing of the elastic member 18 with the projection 10b. In this case, the portion of the socket 6 exposed to the exterior of the lamp body 2 is made to be of the waterproof structure. The dismounting can be realized in simple manner by removing the screws 9. Other arrangements in the present embodiment are the same as the foregoing embodiments and are shown by the same reference numbers in FIGS. 17 and 18.

Figure 19:
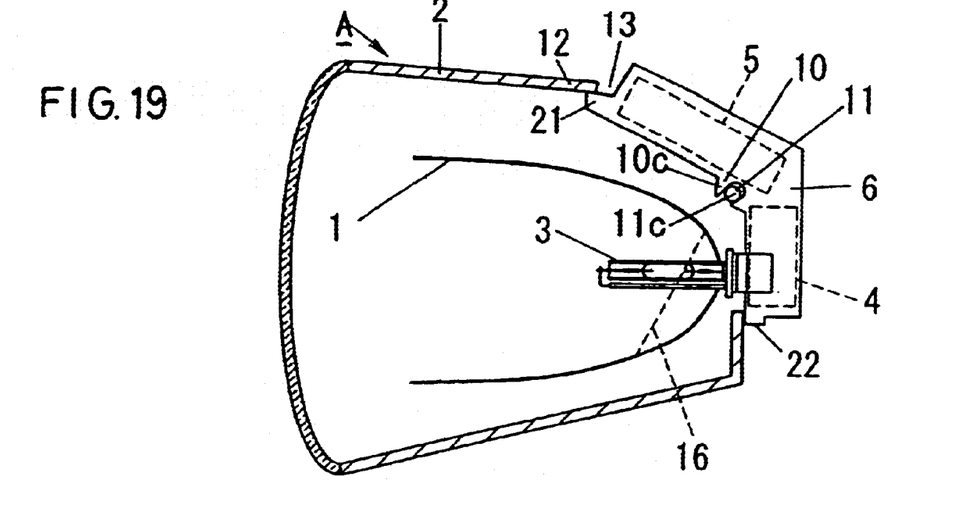
FIG. 19 is an explanatory view for an arrangement in another embodiment of the present invention.
Figure 20:
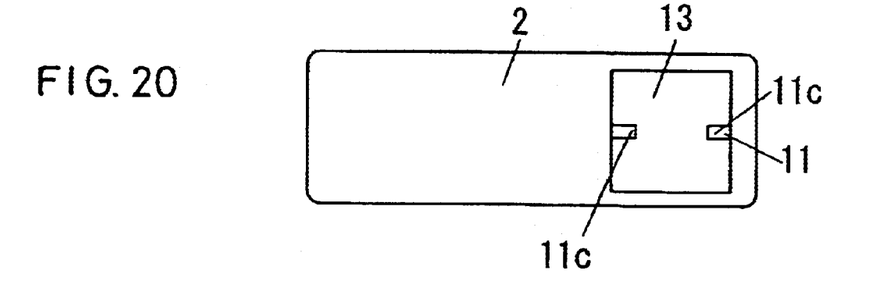
FIG. 20 is a plan view of a lamp body in the embodiment of FIG. 19.
Figure 21:
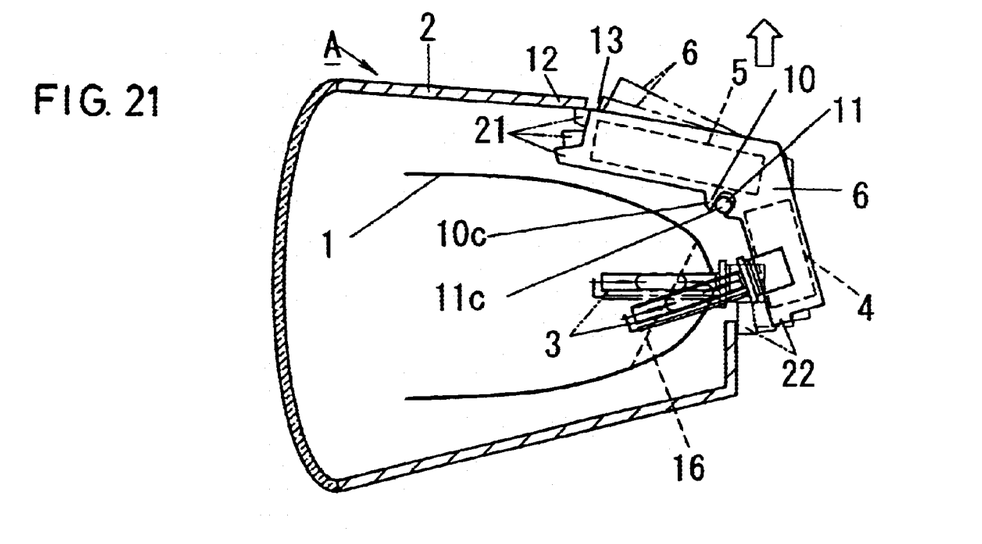
FIG. 21 is an explanatory view for an assembled state of the luminaire of FIG. 19.

In another embodiment of the present invention as shown in FIGS. 19–21, the aperture 13 is provided at least at part of a top surface 12 of the lamp body 2. The aperture 13 is provided to be continuous over a rear part of the top surface 12 of the lamp body 2 and the rear part of the lamp body 2, and the aperture 13 is provided substantially at center part in vertical direction with shafts 11c projecting on both sides, to form the receiving part 11. The socket 6 is substantially L-shaped in side views and incorporates therein both of the igniter 4 and lighting circuit 5, and the discharge lamp 3 is fixed to the socket 6. At an inner corner part of this L-shaped socket 6, a substantially C-shaped shaft bearing 10c forming the coupler 10 is provided, and an inside margin 21 is provided at front top end of the socket 6 while an outside margin 22 is provided at front bottom end-of the socket 6.

Now, the socket 6 is disposed in the aperture 13 of the lamp body 2 to simultaneously insert the discharge lamp 3 mounted to the socket 6 through the aperture 13 of the lamp body 2 into the opening 16 of the reflector 1 to be housed in the reflector 1, and, in this state, the socket 6 is mounted to the lamp body 2 by engaging the substantially C-shaped shaft bearings 10c to the shafts 11c (see in particular FIG. 19).

In this case, the inside margin 21 at the front top end of the socket 6 engages inner face of top end edge of the aperture 13 of the lamp body 2, whereas the outside margin 22 at the front bottom end of the socket 6 comes into a state of engaging outer face of bottom end edge of the aperture 13.

In dismounting the socket 6, the socket 6 is rotated as shown in FIG. 21 with the engaging part of the shafts 11c with the shaft bearings 10c made as the center, to have the inside margin 21 separated from the inner face of the top end edge of the aperture 13 of the lamp body 2 and to have the outside margin 22 separated from the outer face of the bottom end edge, and, in this state, the socket 6 is drawn in the direction shown by an arrow in FIG. 21, that is, in upward direction, to disengage the shaft bearings 10c from the shafts 11c, whereby the socket 6 can be dismounted without causing the inside margin 21 to be caught by the end edge of the aperture 13.

According to the present embodiment, the socket 6 is allowed to be dismounted as drawn upward or to be mounted from upper side, so that, when the lamp body 2 is mounted to an automobile, the socket 6 is enabled to be mounted and dismounted to and from the lamp body 2 through an operation from the upper side, and the socket 6 can be easily exchanged. Further, other arrangements in the present embodiment are the same as the foregoing embodiments and are shown with the same reference numbers in FIGS. 19–21.

Figure 22:
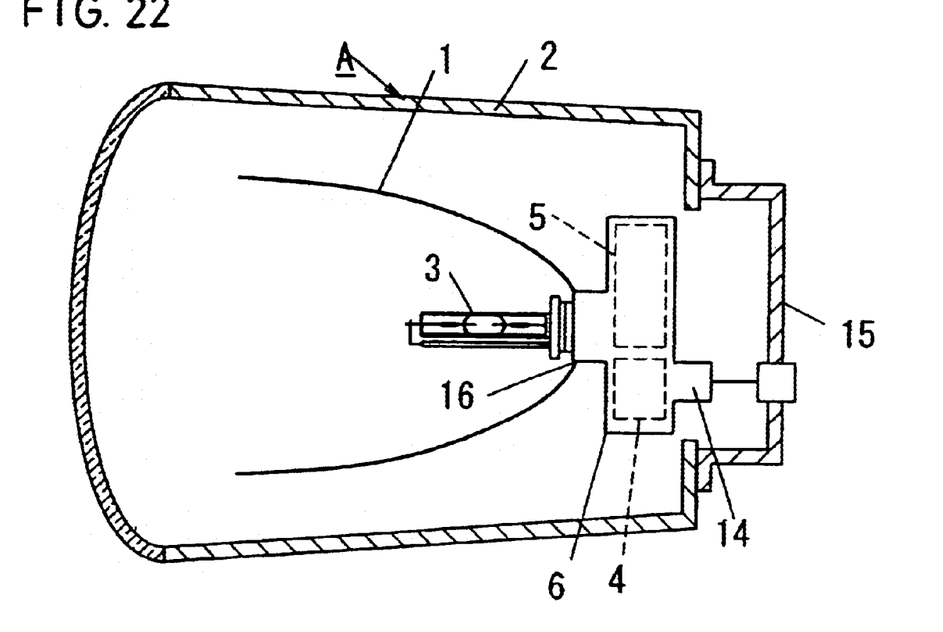
FIGS. 22 and 23 are respectively explanatory views for arrangements in other embodiments of the present invention.

In another embodiment of the present invention as shown in FIG. 22, a power-source coupler 14 provided to the socket 6 and a power-source coupler 14a provided to the lamp-body cover 15 are connected by means of a harness. Also in this embodiment, both of the igniter 4 and lighting circuit 5 are incorporated in the socket 6 similarly to the foregoing embodiments, the socket 6 including the igniter 4 or the lighting circuit 5 can be all made to be of the waterproof structure, and its dimensional minimization, weight reduction and cost reduction can be attempted.

Further in the embodiment of the present invention shown in FIG. 22, there is shown the arrangement in which the socket 6 incorporating therein both of the igniter 4 and lighting circuit 5 and having the discharge lamp 3 fixed thereto is detachably fixed to the reflector 1 disposed in lamp body 2. This socket 6 may be so arranged as to be detachably fixed to the lamp body 2.

Figure 23:
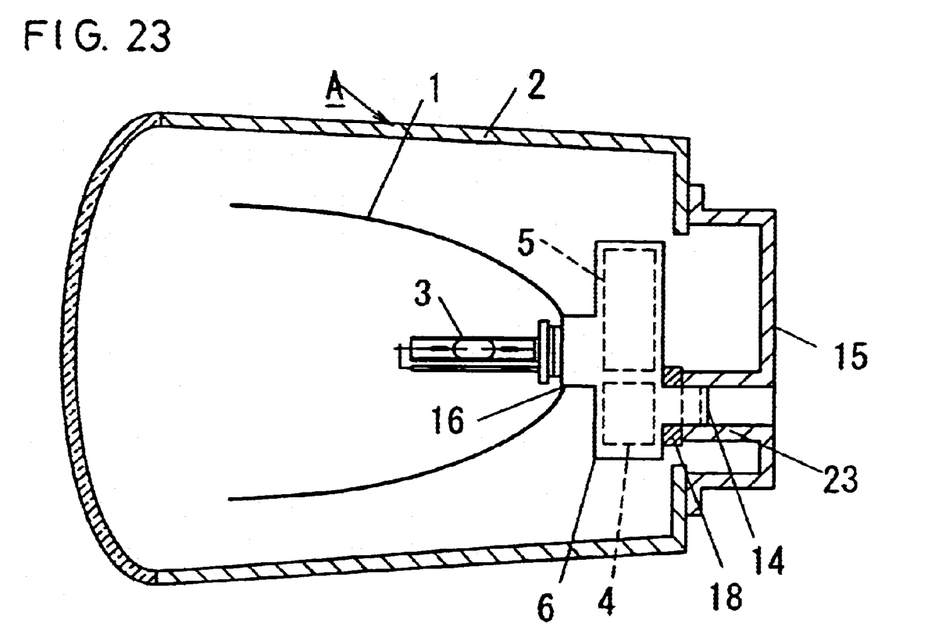

In another embodiment of the present invention as shown in FIG. 23, a power-source coupler 14 is provided to the socket 6, this power-source coupler 14 of the socket 6 is fitted in a fitting tube 23 provided to the lamp-body cover 15, and the elastic member 18 is interposed between the socket 6 and forward end face of the fitting tube 23, whereby the lamp-body cover 15 is no more required to be provided with such separate power-source coupler 14a as in the embodiment of FIG. 22, so that such parts as the coupler, harness or the like can be omitted, and the cost reduction can be attempted.

What is claimed is:

1. A luminaire comprising a lamp body, a discharge lamp, a discharge-lamp lighting circuit including an igniter and an inverter, and a socket for electrically connecting between the discharge lamp and the lighting circuit, the discharge lamp being fixed to the socket, and the socket housing therein both of the igniter and the inverter and being detachably mounted to the lamp body to dispose the discharge lamp within the lamp body.

2. A luminaire comprising a reflector, a lamp body, a discharge lamp, an igniter, a lighting circuit including an inverter, and a socket, wherein both of the igniter and inverter are incorporated in the socket, the discharge lamp is fixed to the socket, the socket is fixed to the reflector, and the discharge lamp is housed in the reflector.

3. The luminaire according to claim 2 wherein the socket is provided with a mounting part, and the reflector is provided with a receiving part, the mounting part being engaged as rotated with the receiving part.

4. The luminaire according to claim 2 wherein the socket is provided with a mounting part, and the reflector is provided with a receiving part, the mounting part being mounted to the receiving part by means of screws.

5. The luminaire according to claim 2 wherein the socket is provided with a coupling part, and the lamp body is provided with a receiving part, the coupling part being engaged to the receiving part to be mounted thereto.

6. A luminaire comprising a reflector, a lamp body, a discharge lamp, an igniter, a lighting circuit including an inverter, and a socket, wherein both of the igniter and the inverter are provided to the socket, and the socket is fixed to the lamp body to have the discharge lamp housed within the reflector, wherein the lamp body is provided with an aperture at least at a top face of part of the lamp body, the socket is provided with a coupling part, and the lamp body is provided with a receiving part, the coupling part being engaged to the receiving part.

7. A luminaire comprising a reflector, a lamp body, a discharge lamp, an igniter, a lighting circuit including an inverter, and a socket, wherein both of the igniter and the inverter are disposed in the socket, the socket and reflector are molded integral, the discharge lamp is fixed to the socket, and the discharge lamp is housed in the reflector.

8. The luminaire according to claim 6 wherein the socket is provided with a power-source coupler.

9. The luminaire according to claim 6 wherein the socket is provided with a coupling part, the lamp body is provided with a receiving part, an elastic member is interposed between the socket and the lamp body, and the coupling part is engaged as rotated to the receiving part.

10. The luminaire according to claim 6 wherein the socket is provided with a coupling part, the lamp body is provided with a receiving part, and the coupling part is mounted to the receiving part by means of screws with an elastic member interposed between the socket and the lamp body.

* * * * *